(No Model.)

J. C. STEVENS.
ICE VELOCIPEDE.

No. 473,434. Patented Apr. 19, 1892.

WITNESSES:
Wm. Musser
A. B. Jenkins

INVENTOR
John C. Stevens
by Chas. L. Burdett
ATTORNEY.

UNITED STATES PATENT OFFICE.

JOHN C. STEVENS, OF HARTFORD, CONNECTICUT.

ICE-VELOCIPEDE.

SPECIFICATION forming part of Letters Patent No. 473,434, dated April 19, 1892.

Application filed January 14, 1891. Serial No. 377,730. (No model.)

*To all whom it may concern:*

Be it known that I, JOHN C. STEVENS, of Hartford, in the county of Hartford and State of Connecticut, have invented certain new and useful Improvements in Velocipedes, of which the following is a full, clear, and exact description, whereby any one skilled in the art can make and use the same.

The object of my invention is to provide a new and novel vehicle of the general class of velocipedes that may be used on surfaces covered by snow or ice, and is also so constructed as to be readily changed so as to be used on ordinary roads like other vehicles of its class.

To this end my invention consists in details of the construction of the several parts making up the vehicle as a whole and in their combination, as more particularly hereinafter described, and pointed out in the claims.

Figure 1:
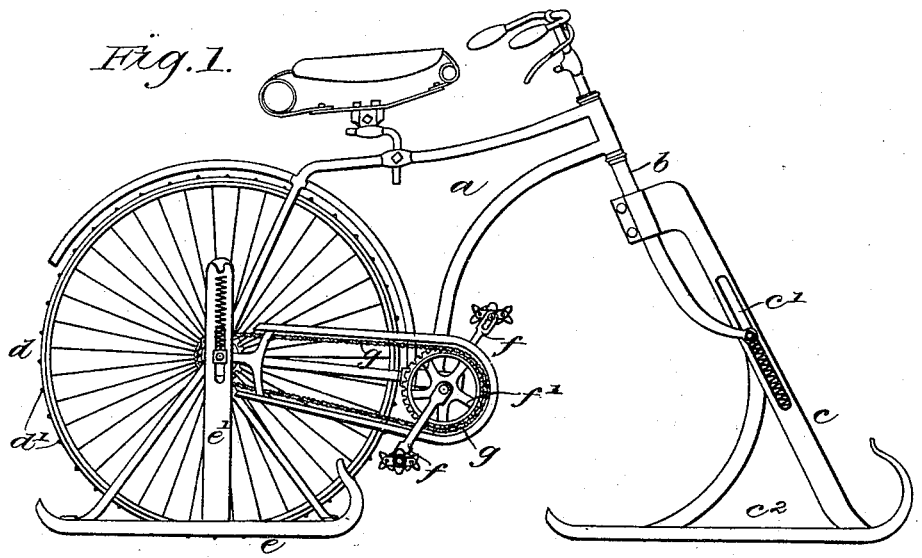
Figure 2:
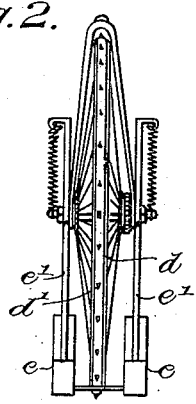
Figure 3:
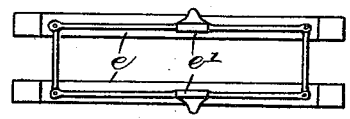

Referring to the drawings, Figure 1 is a view in side elevation of a bicycle embodying my invention. Fig. 2 is a detail view in rear elevation of the driving-wheel and appurtenant runners. Fig. 3 is a detail top view of the rear runners.

My invention is adapted for use on various kinds of velocipedes or like vehicles; but it is herein described with reference to one of the Safety type of bicycles, in connection with which it is preferably used.

In the accompanying drawings the letter $a$ denotes the frame of the machine that may be of any convenient form and material, but is preferably of steel, having at the front end a socket in which the front fork $b$ is pivoted, so that it may rotate. To this front fork a runner-frame $c$ is connected, as by a pin, that passes through a slot $c'$ in the upright portion of the frame, on the lower end of which is secured a runner $c^2$, the bottom of which is adapted to rest on and slide along the surface of snow or ice.

On the rear part of the frame is supported a wheel $d$, and a removable runner-frame $e$ is connected to the frame in such manner as to allow the rim of the driving-wheel to rest upon the surface that the runners slide on with a sufficient pressure to utilize the wheel as a means of propulsion. The rim of this wheel is provided with a number of spurs $d'$, that are sharp enough to drive into the surface so as to give a sure means for holding and for the exertion of the propelling force, the rotary motion of the wheel being imparted by means of the ordinary arrangement of the cranks $f$, secured to a shaft, on which the sprocket-wheel $f'$ is fastened and from which a chain $g$ extends to a sprocket-wheel that is fast to the axle of the wheel $d$.

A saddle for the rider is adjustably secured to the backbone of the frame, and the upper extension of the front fork has any convenient form of handle-bar.

The runner-frame that is secured to the rear wheel is preferably double—that is, two runners are provided that lie on opposite sides of the wheel—the uprights $e'$ from such runners forming a means of support to which the extensions of the axle of the rear wheel are secured, as by collars and nuts, and the wheel is preferably suspended by means of springs that are secured to the frame and to extensions of the axle.

I claim as my invention—

1. In a velocipede, a frame supporting a seat, rotatable steering-fork, crank-sprocket, and propelling-wheel bearing a sprocket connected with the crank-sprocket, in combination with a runner detachably connected with the steering-fork, and runners elastically connected with the frame on each side of the propelling-wheel, substantially as specified.

2. In a velocipede, a frame supporting a seat, rotatable steering-head, crank-sprocket, and propelling-wheel bearing a sprocket connected with the crank-sprocket, in combination with a runner elastically and detachably connected with the steering-fork, and runners elastically and detachably connected with the frame on each side of the propelling-wheel, substantially as specified.

JOHN C. STEVENS.

Witnesses:
CHAS. L. BURDETT,
CONSTANT L. TUTTLE.